July 5, 1932.  W. F. HEINEMAN  1,866,256
METHOD OF FLASH WELDING TUBULAR ARTICLES
Filed May 13, 1929
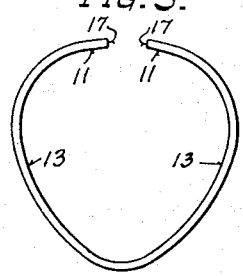
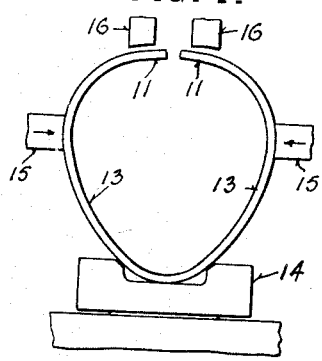
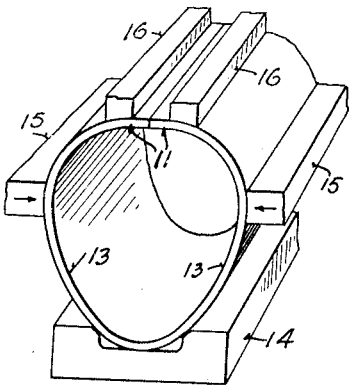
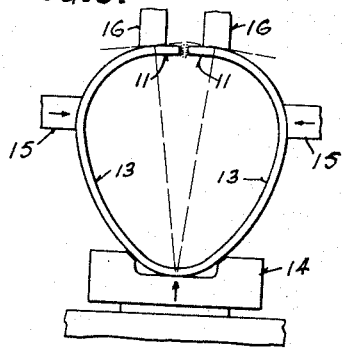
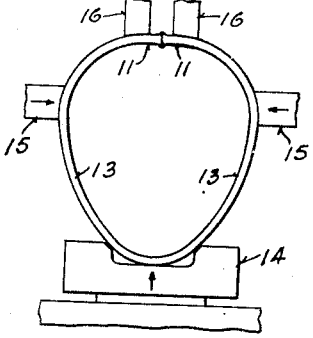
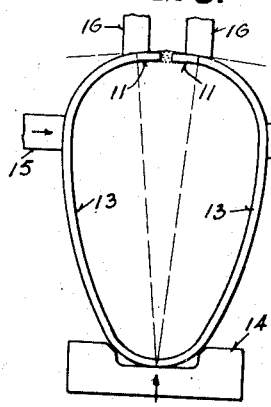
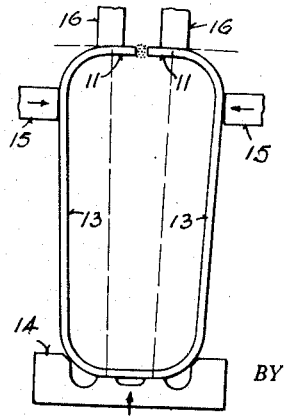
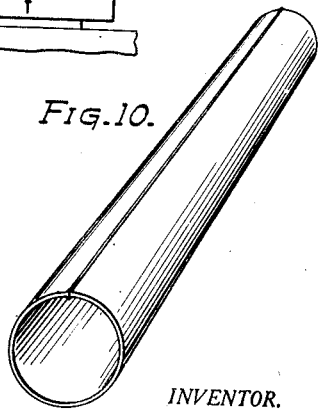
INVENTOR.
Warren F. Heineman
BY
ATTORNEY.

Patented July 5, 1932

1,866,256

UNITED STATES PATENT OFFICE

WARREN F. HEINEMAN, OF SHOREWOOD, WISCONSIN, ASSIGNOR TO A. O. SMITH CORPORATION, OF MILWAUKEE, WISCONSIN, A CORPORATION OF NEW YORK

METHOD OF FLASH WELDING TUBULAR ARTICLES

Application filed May 13, 1929. Serial No. 362,722.

This invention relates to the manufacture of welded sheet metal pipe in which manufacture a metal sheet is converted into tubular form having its longitudinal edges in opposed relation. The edges are then heated to welding temperature by simultaneously establishing and maintaining an electric arc between the same throughout their full common length and are thereafter pressed together to complete the weld.

One of the obstacles attending previous attempts to flash weld tubular articles of substantial lengths, such as pipe commonly used in the pipe line industry for the transportation of oil, gas, and other fluids, was in the inability to preserve proper spaced alignment of the edges during the flashing operation. This difficulty was largely due to the fact that in such operation the edges must be preserved uniformly spaced apart in a relatively movable relationship to each other.

Another difficulty encountered resides in the inability to obtain stable and uniform electrical contact between the electrodes and the walls of the tube to be welded, during the movements necessary to perform the welding operation, so that a proper welding current may be uniformly distributed along the edges. This difficulty is peculiar to the flash welding process, as in other welding processes the edges are maintained in abutted relation during the heating and welding thereof. In order to provide a good electrical contact and to preserve the desired alignment between the edges for the reasons above mentioned, there should be no slipping or moving of the electrodes relative to the walls of the tube while maintaining the flashing arc.

The object of the invention is to overcome the difficulties above mentioned and to provide a method whereby the successful manufacture of sheet metal pipe of commercial lengths may be accomplished by the flash welding process.

The invention resides in pressing the electrodes onto the walls of the pipe adjacent the edges to be welded and applying sufficient pressure to the electrodes to cause a deflection of the marginal walls of the pipe to a predetermined degree while concurrently imparting sufficient rigidity to the side walls of the pipe to withstand the electrode pressures and thereby prevent collapse of the walls during the application of the pressures thereto.

In order to minimize the tendency towards slippage or movement between the electrodes and the surface of the article during the welding operation, it is preferable to deflect the marginal walls to such a degree that when the latter are in their final deflected position the tangent at the center of contact between each electrode and the pipe is substantially perpendicular to the clamping component of the electrode pressure.

In order to provide sufficient rigidity to the side walls to withstand the deflecting pressures of the electrodes, the tubular blank is preferably of oblong shape, and, to impart maximum electrode pressures with a minimum of deflection, it is advisable to decrease the maximum transverse distance between the line of application of the electrode pressure and the supporting side wall. The exact configuration of the tubular blank is dependent upon the diameters of the tube and the elasticity of the walls, the object of the invention being to provide a shape or configuration that will have sufficient rigidity to withstand the electrode pressures necessary to provide a good electrical contact between the electrode and the wall surface and prevent slippage of the electrode during the welding operation.

This application and my copending application Serial No. 499,210, filed December 1, 1930, are continuations in part of application Serial No. 244,026, filed December 31, 1927.

The invention may be more readily understood by referring to the accompanying drawing in which:

Figure 1 illustrates a blank sheet of metal from which the tubular article is to be made.

Fig. 2 is an end view of the blank after the same has been subjected to the preliminary shaping operation.

Fig. 3 is an end view after the final shaping operation.

Fig. 4 illustrates diagrammatically a welding machine having the tubular article shown in Fig. 3 therein.

Fig. 5 is a similar view but showing the tubular article in clamped position.

Fig. 6 illustrates the position of the edges during the flashing operation.

Fig. 7 shows the weld completed.

Figs. 8 and 9 illustrate further modifications of the invention.

Fig. 10 is a perspective view of the finished pipe.

In the drawing, the numeral 10 indicates a metal sheet having a length corresponding to the desired length of the tubular article and having a width properly proportioned to the circumference thereof. The sheet may be first subjected to a preliminary shaping operation wherein the longitudinal marginal edges of the blank are bent to form two flanges 11—11 which flanges extend preferably at an obtuse angle to the base portion 12 of the blank. The article thus formed may be next bent into a tubular structure in any suitable manner such as by pressing, rolling or stamping with the longitudinal edges 17—17 in spaced relation, as is clearly shown in Fig. 3.

The blank thus formed is preferably oblong in cross section and of a configuration providing sufficient rigidity to the intermediate side walls 13—13 to withstand the electrode pressures hereinbefore mentioned, which pressures must be sufficient to provide a good electrical contact between the electrodes and the tubular walls.

The blank is inserted in a welding machine of suitable construction for flash welding, which machine has incorporated therein a base 14 for supporting the blank and suitable clamping members for bringing the longitudinal marginal edges of the tube into proper longitudinal alignment and applying pressure to the edges for welding the same. These clamping members are illustrated diagrammatically as comprising a pair of movable members 15—15 operated by suitable mechanism (not shown) to bring the edges of the tubular blank into contact for aligning the same and to apply the final welding pressure thereto.

Operating in timed relation with the clamping members 15—15 are electrodes 16—16 which are preferably independent from said clamping members 15—15 and which engage the longitudinal walls 11—11 of the tubular article opposite the supporting base 14 to apply pressure to said walls and cause the same to be deflected to a position such as that shown in Figs. 5, and 6.

It is desirable that when the longitudinal marginal walls 11—11 are in their final deflected position in preparation for the welding operation, a tangent drawn to the surface of the tube at the central frictional bearing point between each electrode and the walls of the tube will be substantially perpendicular to a straight line drawn from said center point to the nearest external support opposite thereto as shown in Figs. 6, 8, and 9.

When the marginal walls of the tube have been deflected to the position above specified, there is a minimum tendency towards slippage between the electrodes and the walls of the tubular article during relative movement of the spaced edges in the flashing operation. The deflecting of the marginal edges 11—11 inwardly to a predetermined position by the electrodes will further cause the edges to be brought into horizontal alignment. The preferable method of aligning the edges is set forth in copending application Serial No. 327,925 filed Dec. 22, 1928, by the present inventor.

By the present invention, the edges are maintained in proper longitudinal and transverse alignment and sufficient electrode pressures are provided to effect the desired electrical contact between the electrodes and the pipe during the welding operation. Furthermore the edges may move relative to each other with a minimum tendency towards slippage between the electrode bearing surfaces and the pipe.

For small diameters, it may be preferable to provide a pear-shaped tubular blank, as shown in Fig. 3, whereas for the larger diameters, a more oblong pear shape or rectangular configuration, as shown in Figs. 8 and 9, may be advisable.

While different modifications and methods of flash welding may be employed for the welding operation, it is preferable to align the edges, as above set forth, and then to separate the same a predetermined distance before applying the welding current thereto. This separation is effected by withdrawing the clamping members 15—15 and moving the electrodes 16—16 apart, the frictional engagement of the electrodes upon the marginal wall of the blank causing a separation of the edges and the subsequent relative movement of the same required in the flashing operation. When the welding current is applied, the electrodes 16—16 are employed to bring the edges together slowly to establish a flashing arc therebetween throughout the full common length thereof.

The oblong shape of the blank increases the flexibility thereof in the direction of the minor axis and thereby facilitates movement of the edges in spaced relation when employing the frictional engagement of the electrodes with the marginal walls of the blank for that purpose and tends to prevent slipping of the electrodes.

During the maintenance of the flashing arc, the edges are fed thereto at a rate which will maintain the arc until the edges have reached the proper welding temperature after which the clamping elements 15—15 are employed to press the edges together to complete the weld. The welding current may be turned off either before or subsequent to the application of the final welding pressure. The tubular article thus produced may be subsequently sized in any suitable manner to the desired shape.

While the final deflected position of the marginal walls has been above described, it is to be understood that the exact degree of deflection employed may be varied to a considerable extent and the deflecting to any degree sufficient to accomplish the purposes of this invention is within the conception thereof. Furthermore, the particular shape of the pipe or tubular article may be varied in the attainment of the purposes hereinbefore set forth, and the apparatus employed may be of any suitable design.

Having thus described the invention, what is desired to be secured by Letters Patent is:

1. The method of making sheet metal pipe which comprises forming the longitudinal marginal portions of a metal sheet into flanges extending at an angle to the original plane of the sheet, bending the intermediate portion of the sheet to form a tubular structure of oblong cross section with the edges of the flanges in spaced relation to each other and having the marginal flanges adjacent thereto extending in the direction of the minor axis of the oblong section of the tube, then applying external pressure to the opposite sides of the tubular structure in the direction of the minor axis to bring the longitudinal edges together and into proper longitudinal alignment while applying electrodes to the marginal portions of the tubular structure adjacent the edges to be welded and exerting pressure on said electrodes in the direction of the major axis to deflect the marginal edges and thereby bring the same into transverse alignment, and employing the rigidity of the side walls of the blank in the direction of the major axis to support the marginal edge portions of the blank against the electrode pressures, then establishing and maintaining an electric arc between the edges throughout the full length thereof to heat the same to welding temperature, and thereafter pressing the heated edges together to complete the weld.

2. The method of making sheet metal pipe which comprises forming the longitudinal marginal portions of a metal sheet into flanges extending at an angle to the original plane of the sheet, bending the intermediate portion of the sheet to form a tubular structure of oblong cross-section with the edges of the flanges in spaced relation to each other and having the marginal flanges adjacent thereto extending in the direction of the minor axis of the oblong section of the tube, applying electrodes to the marginal portions of the tubular structure adjacent the edges to be welded and exerting the pressure on said electrodes in the direction of the major axis of the blank while employing the rigidity of the side walls of the blank in the direction of the major axis to support the marginal edge portions of the blank against the electrode pressures, establishing and maintaining an electric arc between the edges throughout the full length thereof to heat the same to welding temperature, and thereafter pressing the heated edges together to complete the weld.

3. In the method of making flash welded tubular articles, the steps which comprise converting a metal sheet into tubular form with the longitudinal edges thereof in spaced relation, applying electrodes externally to the tubular blank adjacent each of said edges and on opposite sides of the line of weld, exerting pressure on said electrodes to deflect the marginal walls in contact therewith inwardly to a predetermined degree such that a line tangent to the tubular wall at the center point of the frictional bearing surface of each electrode is substantially perpendicular to a straight line from said center point to the nearest external support opposite thereto, and moving said electrodes to effect predetermined relative movement of the edges for flashing by reason of the frictional engagement of the electrode with the marginal walls of the blank.

4. In the method of making flash welded tubular articles, the steps which comprise converting a metal sheet into tubular form with the longitudinal edges thereof in spaced relation, applying pressure members to the tubular blank adjacent each of said edges to deflect the marginal walls in contact with said members inwardly to a predetermined degree such that a line tangent to the tubular wall at the center point of the frictional bearing surface of each of said pressure members is substantially perpendicular to a straight line from said center point to the nearest external support opposite thereto, and moving said members to effect predetermined relative movement of the edges for flashing by reason of the frictional engagement of the pressure members with the marginal walls of the blank.

5. In the method of making flash welded tubular articles, the steps which comprises converting a metal sheet into tubular form of oblong cross section with the longitudinal edges thereof in spaced relation and the marginal wall portions adjacent said edges extending in the direction of the minor axis of the tube, applying electrodes externally to said marginal wall portions on opposite sides of the line of weld, exerting pressure on said electrodes to deflect the marginal walls in contact therewith inwardly to a predetermined degree such that a line tangent to the tubular wall at the center point of the frictional bearing surface of each electrode is substantially perpendicular to a straight line from said center point to the nearest external support opposite thereto, while employing the rigidity of the side walls of the blank in the direction of the major axis to support the marginal wall portions of the blank against the electrodes pressures, and moving said electrodes to effect predetermined relative movement of the edges for flashing by reason of the frictional engagement of the electrodes with the marginal walls of the blank.

6. In the method of making flash welded tubular articles, the steps which comprise converting a metal sheet into tubular form of oblong cross section with the longitudinal edges thereof in spaced relation and the marginal wall portions adjacent said edges extending in the direction of the minor axis of the tube, applying pressure members externally to said marginal wall portions on opposite sides of the line of weld to deflect said marginal walls inwardly to a predetermined degree such that a line tangent to the tubular wall at the center point of the frictional bearing surface of each of said pressure members is substantially perpendicular to a straight line from said center point to the nearest external support opposite thereto, while employing the rigidity of the side walls of the blank in the direction of the major axis to support the marginal wall portions of the blank against said pressure members, and moving said pressure members to effect predetermined relative movement of the edges for flashing by reason of the frictional engagement of the pressure members with the marginal walls of the blank.

7. In pipe making, the method which comprises the steps of turning up the side margins of a metal sheet to form stiff, narrow flanges standing at an angle to the plane of the sheet, bending the sheet to form a transversely resilient, tubular structure of oblong cross-section with the edges of the flanges separated by a gap at one of the sides of the structure in its lesser diameter, applying pressure to opposite sides of the structure in its major diameter to overcome the resiliency thereof and close the said gap to bring the edges together, applying electrodes to the marginal flange portions adjacent the edges and exerting pressure on the same perpendicularly to the side pressures applied to the blank to deflect the said flange portions inwardly, passing an electric current through the said edges, withdrawing the side pressures to permit the edges to spring apart and establish an arc across the gap to heat the edges to welding temperature, and again exerting side pressure to bring the heated edges into welding contact.

8. In pipe making, the method which comprises the steps of turning up the side margins of a metal sheet to form stiff, narrow flanges standing at an obtuse angle to the plane of the sheet, bending the sheet to form a transversely resilient tubular structure of substantially rectangular cross-section with the edges of the flanges aligned but separated by a gap at one of the sides of the structure in its lesser diameter, applying pressure to opposite sides of the structure in its larger diameter to overcome the resiliency thereof and close the said gap and bring the edges together, applying electrodes to the marginal flange portions adjacent said edges and exerting pressure thereon independently of the side pressure and in a direction substantially perpendicular thereto to deflect the said edges inwardly and to make electrical contact therewith, passing an electric current through the said edges, withdrawing the side pressure to allow the edges to be separated, establishing an arc across the gap between said edges to heat the same to welding temperature, and again exerting side pressure to bring the heated edges into welding contact.

9. The method of making pipe which comprises the steps of forming a blank by bending a flat sheet of metal to the shape of a tube of oblong cross-section with its edges meeting in the plane of the major axis in parallel relation constituting a welding cleft, applying electrodes to the surface of the blank at each side of the welding cleft, exerting force inwardly by the electrodes to establish predetermined electrode pressure and frictional engagement between the electrodes and the blank the minor axis of the blank being so proportioned with regard to the resilient characteristics of the material of the blank that under the predetermined electrode pressure the blank is deflected to the position at which a line tangent to the surface engaged by each electrode is at right angles at the point of tangency to the line of action of the force exerted by the electrode, moving the electrodes to adjust the positions of the edges of the sheet for bringing them into welding relation while maintaining the predetermined electrode pressure, establishing an electric arc across the welding cleft to heat and burn away the edges, moving the electrodes to feed the edges toward each other without relative motion between the electrodes and the blank as the edges are burned away, and then exerting pressure on the sides of the blank to force the heated edges together to weld them.

In witness whereof I have signed my name at Milwaukee, Wisconsin, this 9th day of May, 1929.

WARREN F. HEINEMAN.